US006502988B2

(12) United States Patent
Koch et al.

(10) Patent No.: US 6,502,988 B2
(45) Date of Patent: Jan. 7, 2003

(54) ARRANGEMENT OF A COVER STRIP ON A LINEAR GUIDE

(75) Inventors: Richard Koch, Gerhardshofen (DE); Johann Kremer, Erlangen (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/918,067

(22) Filed: Jul. 30, 2001

(65) Prior Publication Data

US 2002/0014140 A1 Feb. 7, 2002

(30) Foreign Application Priority Data

Aug. 3, 2000 (DE) .......................... 100 37 812

(51) Int. Cl.⁷ .............................................. F16C 33/00
(52) U.S. Cl. ........................................................ 384/15
(58) Field of Search .......................................... 384/15

(56) References Cited

U.S. PATENT DOCUMENTS

| 3,785,418 A | * | 1/1974 | Hennig et al. ............... 150/154 |
| 3,845,993 A | * | 11/1974 | Schiler ........................ 384/45 |
| 4,886,375 A | * | 12/1989 | Tsukada ...................... 384/15 |
| 4,968,508 A | * | 11/1990 | Oren et al. .................. 424/468 |
| 5,058,232 A | * | 10/1991 | Stohr ....................... 15/236.01 |
| 5,575,566 A | * | 11/1996 | Faulhaber .................... 384/15 |
| 5,622,433 A | * | 4/1997 | Suzuki et al. ................. 384/15 |
| 5,871,283 A | * | 2/1999 | Isobe et al. ................... 384/15 |

FOREIGN PATENT DOCUMENTS

| DE | 3046590 | 7/1982 |
| DE | 237805 | 7/1986 |
| DE | 3812505 | 11/1988 |
| DE | 9316349 | 3/1994 |
| DE | 4311641 | 4/1994 |
| DE | 9408850 | 10/1994 |
| DE | 19524810 | 1/1997 |
| DE | 29800700 | 7/1998 |
| EP | 0311895 | 4/1989 |
| EP | 0731283 | 9/1996 |

* cited by examiner

Primary Examiner—Jack Lavinder
Assistant Examiner—Benjamin A Pezzlo
(74) Attorney, Agent, or Firm—Bierman, Muserlian and Lucas

(57) ABSTRACT

In the inventive arrangement of a cover strip (27) on a linear guide, the cover strip (27) is supported through its flat inner surface (32) on a flat support surface (28) of a guide rail (26), which flat support surface delimits a longitudinal groove (25) of the guide rail (26) in inward direction. Two recesses (31) made in the inner surface (32) of the cover strip (27) in the regions of the long sides of the cover strip (27), extend in longitudinal direction and lead to the formation of resilient retaining ledges (33) which serve to fix the cover strip (27) on the guide rail (26).

5 Claims, 3 Drawing Sheets

ARRANGEMENT OF A COVER STRIP ON A LINEAR GUIDE

FIELD OF THE INVENTION

The invention concerns an arrangement of a cover strip for closing bores of a guide rail of a linear guide that are equipped with fixing screws, the cover strip being inserted into a longitudinal groove of the guide rail, an outer surface of the cover strip with respect to the guide rail being disposed in one plane with a running surface of the guide rail, the cover strip comprising two resilient retaining ledges that effect fixing and extend in longitudinal direction of the guide rail while being arranged within the longitudinal groove to bear against lateral groove walls of the guide rail that delimit the longitudinal groove.

BACKGROUND OF THE INVENTION

Guide rails are used on machine tools and, being wear parts, they have to be replaced from time to time for which reason, they are often fixed on the machine frame by screws. It is known to close the bores of a guide rail containing fixing screws either by inserting a plug into the end section of each bore as disclosed, for example, in the documents DE 30 46 590 A1 and DE 93 16 349 U1, or the guide rail is provided with a groove-like recess aligned to the fixing bores, and a cover strip is fitted into this recess. Arrangements of this type are shown, for example, in the documents DD 237 805 A1 and EP 0 311 895 A1. The cover strip is often glued to the guide rail within the groove-like recess so that there is a danger of the glued joint coming loose.

In a linear guide arrangement known from the document DE 38 12 505 A1, a plastic plate or strip is inserted from one end of the guide rail into a longitudinal groove and positively retained therein by ribs. These ribs are integrally formed on the lateral surfaces of the strip and, within the longitudinal groove, they engage into appropriately recessed sections of the guide rail. A longitudinal groove of this type or a dovetail configuration for accommodating a trapezoidal strip can, of course, be made by grinding but since this necessitates very small tools, such a solution would become very expensive.

The document DE 195 24 810 A1 shows an arrangement of the initially cited type in which the cover strip is made up of an upper layer and a lower layer and the two retaining ledges are formed by bending over the long sides of the lower layer. Within the longitudinal groove, the upper layer of the cover strip bears against lateral contact surfaces of the guide rail that are obtained by milling of webs whose inclined portions are produced by pressure rolling and subsequent grinding so that their manufacturing is complex and cost-intensive. Besides this, there is no support for the central region of the cover strip on the guide rail within the longitudinal groove. Thus, there is a potential danger of deformation and vaulting of the cover strip which would detract from the sealing effect on its upper surface.

OBJECTS OF THE INVENTION

It is an object of the invention to improve the arrangement of the cover strip on the guide rail in its function and to make its manufacture more economic and cost effective.

This and other objects and advantages of the invention will become obvious from the following detailed description.

SUMMARY OF THE INVENTION

The invention achieves the above objects by the fact that the cover strip is supported through a flat inner surface on a flat support surface of the guide rail, which flat support surface delimits the longitudinal groove in inward direction, and two longitudinally extending recesses which lead to the formation of the resilient retaining ledges are made in the inner surface of the cover strip in regions of long sides of the guide rails.

Each lateral groove wall of the guide rail can comprise an undercut with a concave cross-section into which a bulge of the adjoining retaining ledge is snapped in. The bulge of the retaining ledge can merge into a V-shaped end region extending toward the guide rail.

The cover strip can be a metal part, for example, a rolled steel strip in which the retaining ledges are formed as a result of the recesses made therein. Such a strip has the advantage that it can be stocked and transported as a roll which can be unwound and cut to size as required for each particular linear guide.

The rolled cover strips of the invention are very economic to manufacture and can be made in any desired length, that is, as endless profiles. The locking of the cover strip in the guide rail is made possible by the appropriate configuration of the rail in the region of the longitudinal groove and by the strip contour. Through the embodiment of the cover strip of the invention, a one-piece seamless and smooth cover is obtained. All that is required for assembly is to press the rolled cover strip into the guide rail.

Due to the special geometry of the cover strip and the longitudinal groove, the cover strip is always in even contact with the support surface so that a deformation and bulging of the cover strip is not possible. This guarantees a long life of the seals of the linear guide which slide on the outer surface of the cover strip and the adjacent running surface of the guide rail during operation.

One example of embodiment of the invention is illustrated in the drawings and will be described more closely in the following in comparison to prior art arrangements and with reference to the drawings.

DETAILED DESCRIPTION OF THE DRAWINGS

Figure 5:
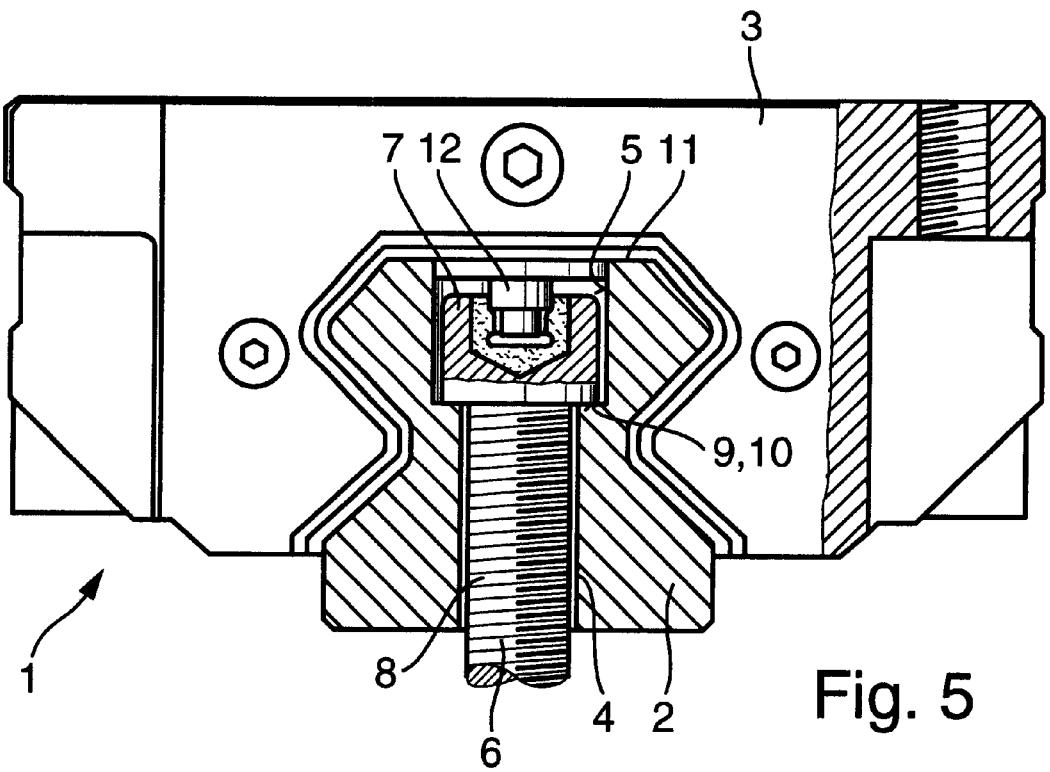
FIG. 5 is a cross-sectional view of a prior art linear guide showing a guide rail surrounded by a carriage and a plug for closing the end section of a bore.

FIG. 5 shows a cross-section of a prior art linear guide 1. This comprises a carriage 3 arranged for sliding on a guide rail 2. Machine elements, not shown, are fixed on the carriage 3 which is supported on the guide rail 2 through a sliding bearing or through endlessly circulating rolling elements, not shown, in its interior.

The guide rail 2 comprises bores 4 extending perpendicular to the direction of movement and each bore 4 has a radially widened end section 5. Fixing screws 6 are disposed in these bores 4 which can be arranged equally spaced along the length of the guide rail 2. The fixing screws 6 have a screw head 7 whose annular surface 9 adjoining the shank 8 of the fixing screw 6 is supported on a shoulder 10 of the end section 5 of the bore 4.

The fixing screws 6 serve to fix the guide rail 4 on a machine platen or the like, not further specified. As viewed in direction of the bore, the screw head 7 of each fixing screw 6 is situated lower than the upper running surface 11 of the guide rail 2. In FIG. 5, the bores 6 are closed by plugs 12 whose end faces are situated in the plane of the running surface 11 of the guide rail 2 in the assembled state.

Figure 6:
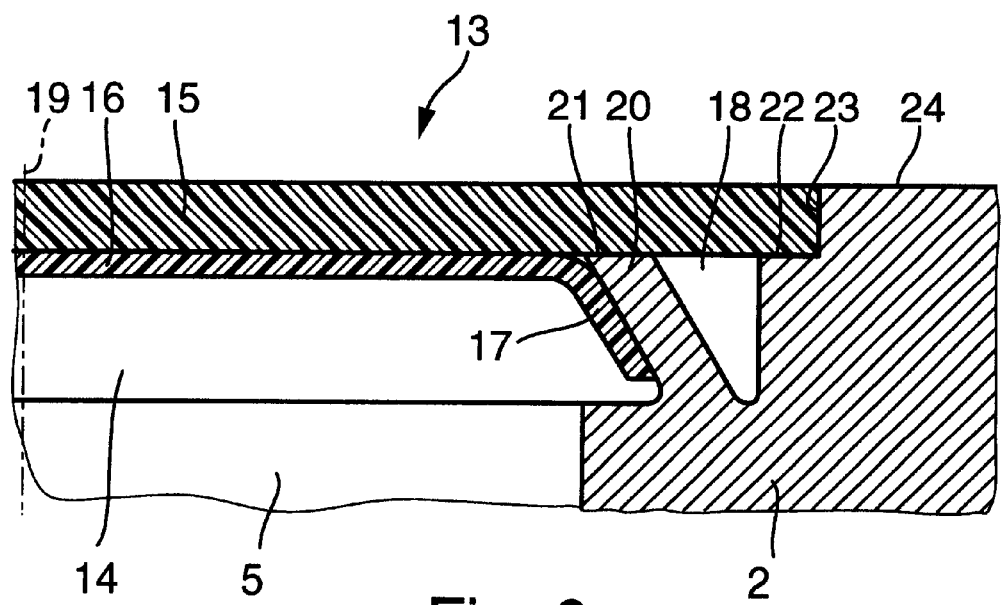
FIG. 6 is an enlarged partial cross-sectional view through the bore region of a guide rail of a further prior art linear guide having a cover strip.

In contrast to the above arrangement, in a further prior art arrangement shown in FIG. 6, a common cover strip 13 inserted into a longitudinal groove 14 of the guide rail 2 is used to close a plurality of successive bores containing fixing screws and having radially widened end sections for receiving screw heads. The cover strip 13 comprises an upper layer 15 and a lower layer 16. Downwardly bent retaining ledges 17 are configured on the two long sides of the lower layer 16. The rest of the lower layer 16 bears against the upper layer 15 of the cover strip 13, the two layers being fixed to each other.

The resilient retaining ledges 17 are retained in the longitudinal groove 14 of the guide rail 2 by the fact that the longitudinal groove 14 has a dovetail configuration which is obtained by making milled recesses 18 in both the sides of the longitudinal groove 14 in the longitudinal direction of the guide rail 2. FIG. 6 shows only the side on the right of the center line 19. The configuration of the left side of this portion of the guide rail is a mirror image of the right side, the center line 19 forming the axis of symmetry.

Webs 20 formed on the guide rail 2 as a result of the milled recesses 18 delimit the longitudinal groove 14 on the two long sides of the guide rail 2. Through a further work step, for example, pressure rolling, the webs 20 are inclined toward the inside of the guide rail 2. This leads to the formation of a dovetail configuration of the longitudinal groove 14. Flat contact surfaces 21 on the webs 20 and flat contact surfaces 22 on lateral edge recesses 23 of the guide rail 2 are obtained by grinding. The upper layer 15 of the cover strip 13 is supported on these contact surfaces 21 and 22. The thickness of the upper layer 15 of the cover strip 13 is chosen so that its outer surface is situated in the plane of a running surface 24 of the guide rail 2.

In the arrangement of the invention shown in FIGS. 1 to 4, the longitudinal groove 25 of the guide rail 26 in which the cover strip 27 is arranged is delimited by a flat support surface 28 which merges within the guide rail 26 into two lateral groove walls 29 extending in the longitudinal direction of the guide rail. Each groove wall 29 comprises a concave undercut 30.

On its two long sides, the cover strip 27 comprises parallel recesses 31 starting from its inner surface 32. This results in the formation of two retaining ledges 33 which serve to fix the cover strip 27 within the longitudinal groove 25 on the guide rail 26. Each retaining ledge 33 comprises a bulge 34 that is oriented toward the outside of the cover strip 27 and that merges into a V-shaped end region 35 which, when the cover strip 27 has been inserted, is oriented toward the guide rail 26.

The cover strip 27 can then be pressed into the longitudinal groove 25 of the guide rail 26 so that its inner surface 32 bears against the support surface 28. The dimensions of the cover strip 27 and the longitudinal groove 25 are chosen so that the outer surface 36 of the inserted cover strip 27 is situated in one plane with a running surface 37 of the guide rail 2, along which running surface the lip seal of the carriage of the linear guide slides during operation.

When the cover strip 27 is being pressed in, the V-shaped end region 35 and the bulge 34 of each retaining ledge 33 slide along the adjoining lateral groove wall 29. During the pressing-in of the cover strip 27, the retaining ledge 33 is bent elastically inwards toward the center of the cover strip 27 till the bulge 34 snaps into the concave undercut 30. This results in a simple fixing of the cover strip 27 in the guide rail 26. If necessary, the cover strip 27 can be pulled out just as simply again out of the guide rail 26 in a corresponding manner.

Figure 1:
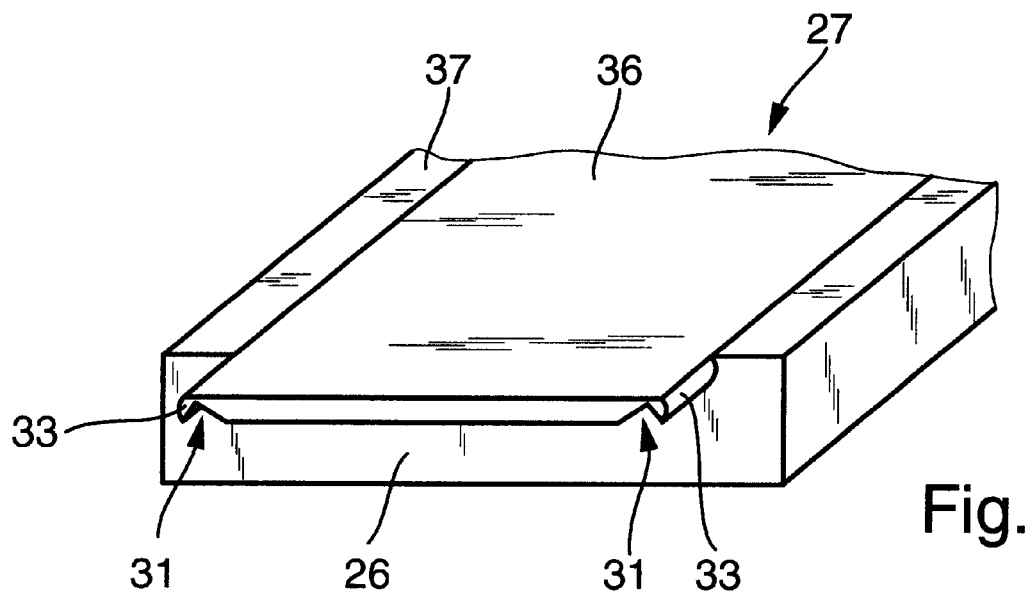
FIG. 1 shows an arrangement of the invention in a perspective view of an end region of a guide rail with an inserted cover strip.
Figure 2:
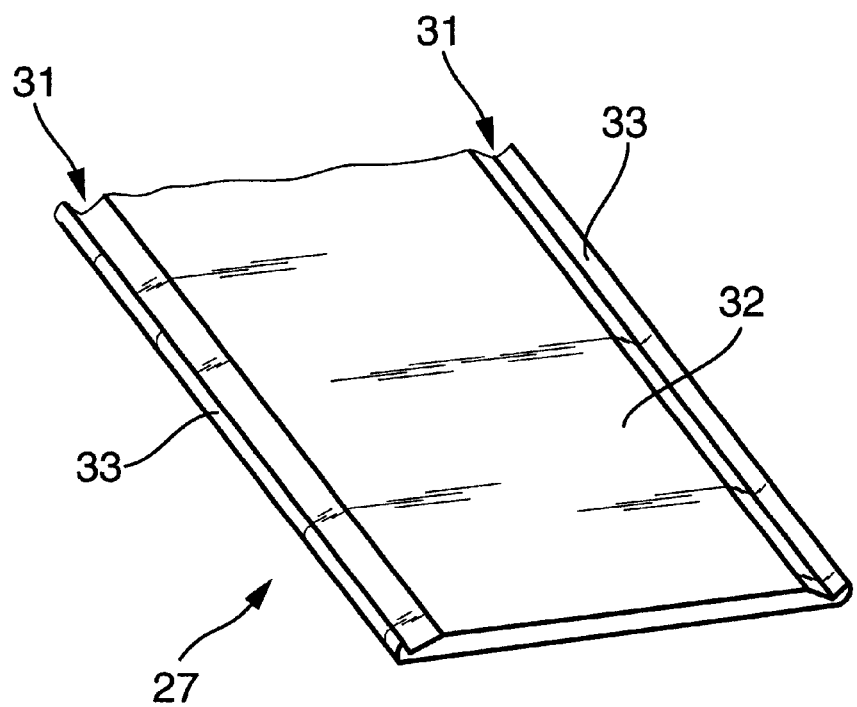
FIG. 2 is a perspective view of the cover strip of FIG. 1 showing the inner surface of the cover strip.
Figure 3:
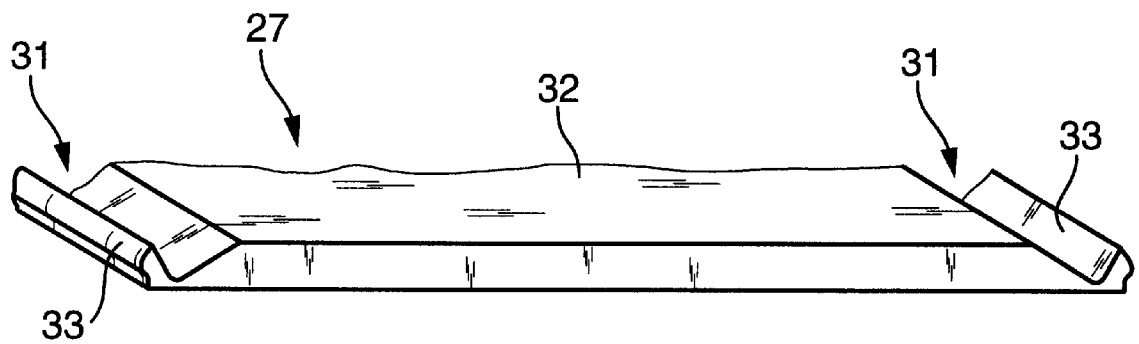
FIG. 3 is a further perspective view of the cover strip of FIG. 1.
Figure 4:
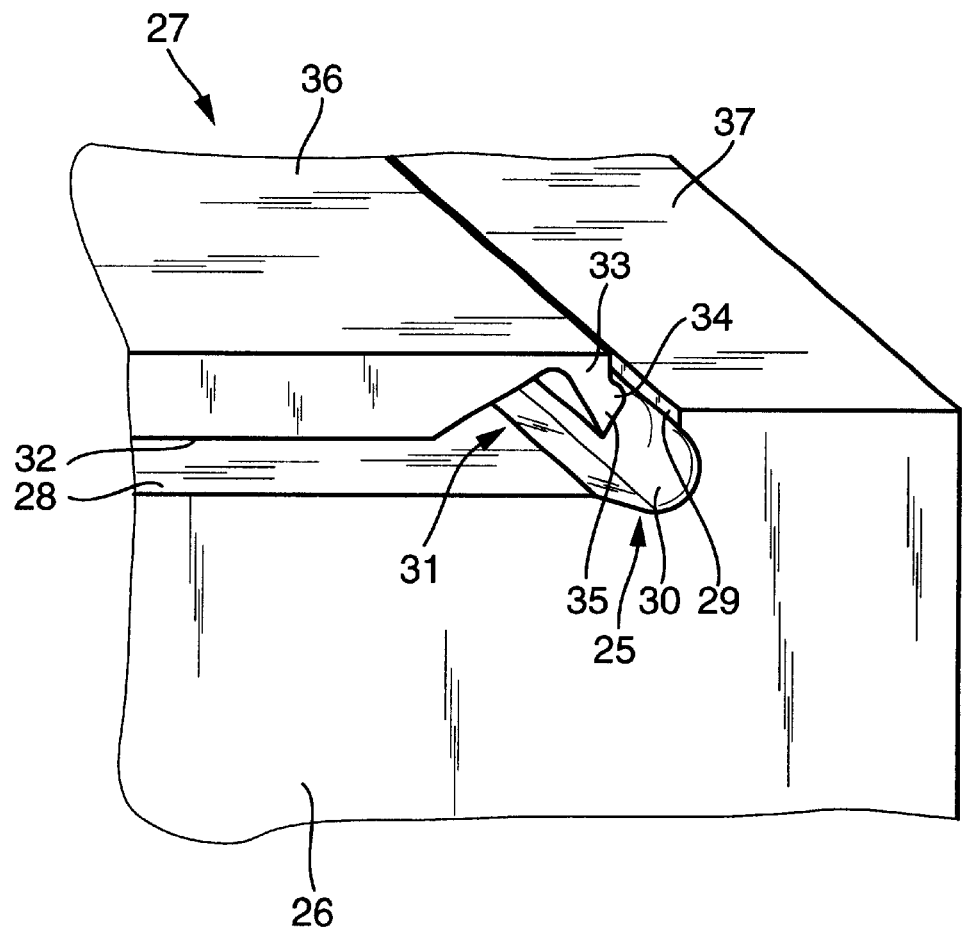
FIG. 4 is an enlarged representation of the connecting region of the cover strip and the guide rail.

It is also possible to configure the longitudinal groove of the guide rail with an exactly rectangular cross-section so that undercuts 30, as comprised in the guide rail 26 shown in FIG. 4, are then not required in the guide rail 26. In such a configuration, the cover strip is retained on the lateral walls of the longitudinal groove in the guide rail solely through the pre-stress of the retaining ledges 33.

What is claimed is:

1. An arrangement of a cover strip for closing bores of a guide rail of a linear guide that are equipped with fixing screws, the cover strip being inserted into a longitudinal groove of the guide rail, an outer surface of the cover strip with respect to the guide rail being disposed in one plane with a running surface of the guide rail, the cover strip comprising two resilient retaining ledges that effect fixing and extend in longitudinal direction of the guide rail while being arranged within the longitudinal groove to bear against lateral groove walls of the guide rail that delimit the longitudinal groove, wherein the cover strip is supported through a flat inner surface on a flat support surface of the guide rail, which flat support surface delimits the longitudinal groove in inward direction, and two longitudinally extending recesses which lead to the formation of the resilient retaining ledges are made in the inner surface of the cover strip in regions of long sides of the guide rail.

2. An arrangement of claim 1 wherein each lateral groove wall of the guide rail comprises an undercut having a concave cross-section into which a bulge of the adjoining retaining ledge is snapped in.

3. An arrangement of claim 2 wherein the bulge of each retaining ledge merges into a V-shaped end region that extends toward the guide rail.

4. An arrangement of claim 1 wherein the cover strip is a metal part.

5. An arrangement of claim 4 wherein the cover strip including the retaining ledges formed due to the recesses is a rolled steel strip.

\* \* \* \* \*